W. C. McGILL.
Ash Shovel.
No. 87,186.            Patented Feb. 23, 1869.
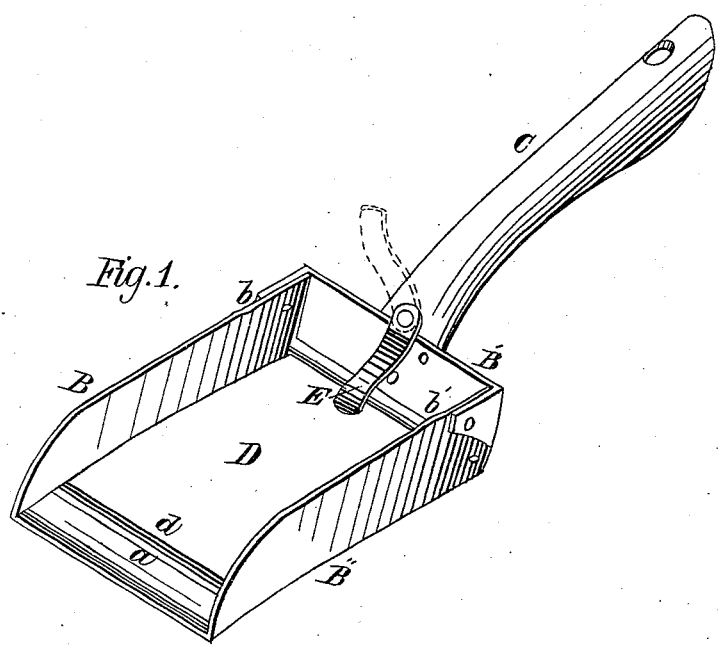
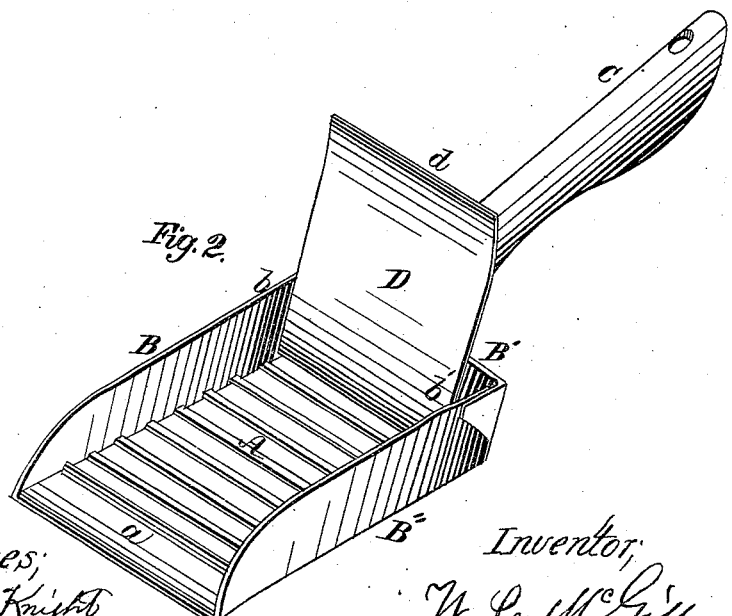
Witnesses:          Inventor,
Geo. H. Knight        W. C. McGill
H. G. Weber
N. PETERS, Photo-Lithographer, Washington, D. C.

United States Patent Office.

WILLIAM C. McGILL, OF CINCINNATI, OHIO.

Letters Patent No. 87,186, dated February 23, 1869.

ASH-SHOVEL AND SIFTER.

The Schedule referred to in these Letters Patent and making part of the same.

*To whom it may concern:*

Be it known that I, WILLIAM C. McGILL, of Cincinnati, Hamilton county, Ohio, have invented a new and useful Ash-Shovel and Sifter; and I hereby declare the following to be a full, clear, and exact description thereof, reference being had to the accompanying drawings, making part of this specification.

My invention relates to an arrangement-shovel, capable of being converted into a sifter or ash-shovel at will.

Figure 1 represents my device as adapted for an ash-shovel.

Figure 2 represents the same as adapted for a sifter.

My sifter is composed of a grid or open plate, A, stiffened around its back and two sides by a curb or flange, B B' B'', to which is attached the customary handle C.

Hinged to the sifter A, near its rear edge, is a flap, D, whose front edge $d$ is turned slightly downward, so as, in the depressed position of the flap, to engage behind and slightly below the upturned rear edge of the front bar $a$ of the sifter. (See fig. 2.)

The sides of the sifter are slightly kinked or curved inward at $b\ b'$, so as to detain the flap in its open or raised position, as at fig. 2.

A button, E, pivoted to the rear part of the shovel or to the handle, enables the operator to fasten the flap D securely down, (see fig. 1,) when it is desired to use the implement as an ash-shovel.

When, on the other hand, it is desired to use the implement as a sifter, the button E is raised. (See dotted lines, fig. 1.)

In its elevated position, (see fig. 2,) the flap D serves as a screen to prevent ashes blowing or scattering over the person using the sifter.

Although preferring the form here selected for illustration, I reserve the right to secure the flap D to its lowest position by means of dents in the side flanges of the shovel, and near its front end, like those shown in the rear for holding the flap up.

By means of this utensil, one is enabled to first separate the cinders from the ashes, and afterward, by simply dropping the flap, to take up the ashes.

I claim herein as new, and of my invention—

The combined ash-shovel and sifter herein described, constructed with narrow bars A, a wide front bar, $a$, a hinged flap, D, whose edge $d$ projects below the rear edge of the bar $a$, and catches E and $b$ to secure said flap in its respective positions, all substantially as and for the purposes set forth.

In testimony of which invention, I hereunto set my hand.

W. C. McGILL.

Witnesses:
GEO. H. KNIGHT,
JAMES H. LAYMAN.